United States Patent
Nagata et al.

(10) Patent No.: US 6,834,821 B2
(45) Date of Patent: Dec. 28, 2004

(54) WEBBING RETRACTOR

(75) Inventors: Tomonori Nagata, Aichi-ken (JP);
Kazuhiko Aihara, Aichi-ken (JP);
Katsuki Asagiri, Aichi-ken (JP);
Yasuho Kitazawa, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 10/292,902

(22) Filed: Nov. 13, 2002

(65) Prior Publication Data

US 2003/0141398 A1 Jul. 31, 2003

(30) Foreign Application Priority Data

Nov. 13, 2001 (JP) .......................................... 2001-347663

(51) Int. Cl.[7] .............................................. B60R 22/28
(52) U.S. Cl. .................................................... 242/379.1
(58) Field of Search ....................... 242/379.1; 280/806; 297/478, 472

(56) References Cited

U.S. PATENT DOCUMENTS

| 6,354,528 B1 | * | 3/2002 | Nagata et al. | ............... 242/374 |
| 6,598,822 B2 | * | 7/2003 | Nagata et al. | ............ 242/379.1 |
| 2003/0098377 A1 | * | 5/2003 | Nagata et al. | ............ 242/379.1 |

FOREIGN PATENT DOCUMENTS

| GB | 2 326 851 | 1/1999 |
| JP | 2000-289572 | 10/2000 |

* cited by examiner

Primary Examiner—Kathy Matecki
Assistant Examiner—Sang Kim
(74) Attorney, Agent, or Firm—Nixon Peabody LLP

(57) ABSTRACT

A webbing retractor is provided. When assembled, due to a positional relationship which is such that insert-in portions are formed between a tubular portion of a lock base and a spool shaft, grooves are formed at the tubular portion and a portion of the spool shaft. An elastically deformable terminal end portion is formed at a stopper which is press-fit into an insert-in hole. In a state in which the stopper also is installed, not only press-in load in a thrusting direction, but also press-in load in a radial direction is applied between the lock base and a spool such that a structure is fixed.

20 Claims, 13 Drawing Sheets

FIG.11A
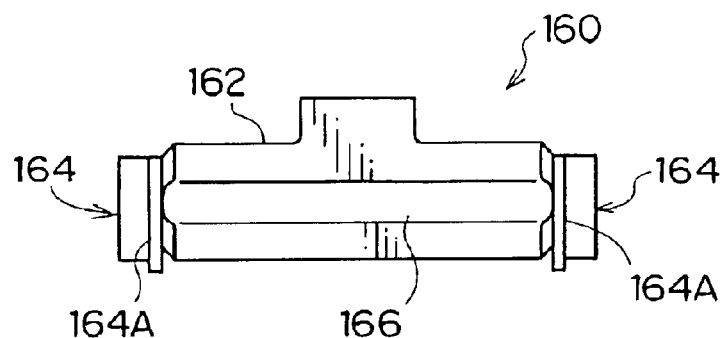
FIG.11B
FIG.11C
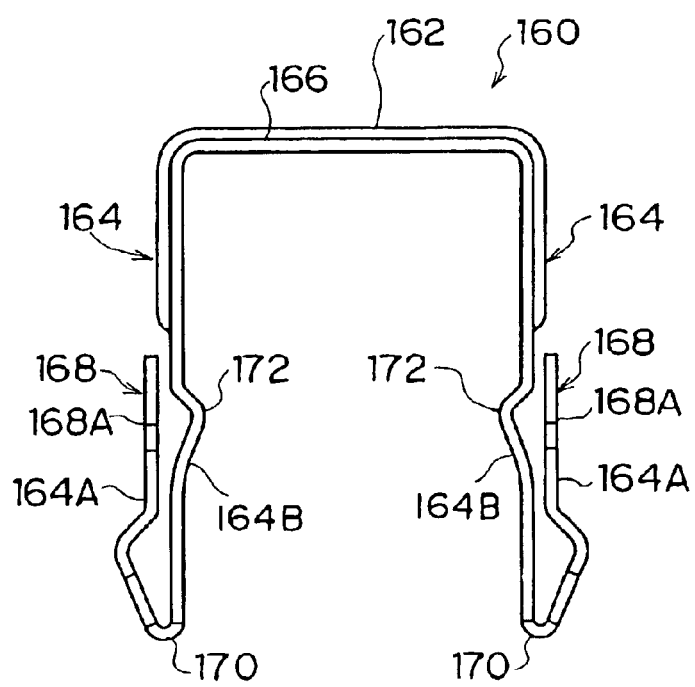
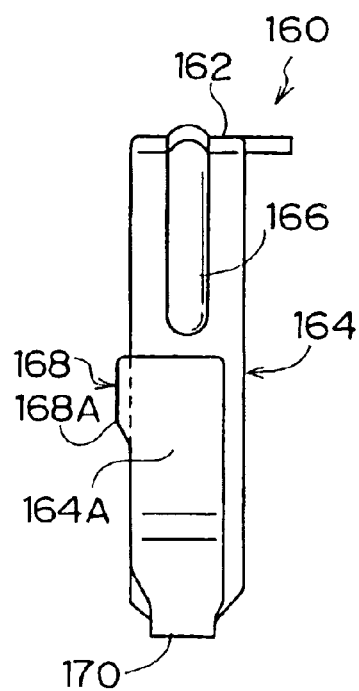

WEBBING RETRACTOR

BACKGROUND OF THE INVENTION

1. Field of the Invention

The present invention relates to a webbing retractor which, at the time a vehicle rapidly decelerates and by using a locking device, temporarily locks rotation in a webbing pull-out direction of a spool on which a webbing for restraining a vehicle occupant is taken-up in a roll form by urging force, and which, in this state, permits a predetermined amount of rotation of the spool in the webbing pull-out direction due to load of a predetermined value or more being applied from the vehicle occupant to the webbing.

2. Description of the Related Art

Generally, a three-point-type seat belt device is structured so as to include a webbing for restraining a vehicle occupant, an anchor plate, a webbing retractor, a shoulder anchor, a tongue plate, and a buckle device. The anchor plate fixes one end portion of the webbing to the floor of the vehicle. The webbing retractor is a device which is disposed at the lower end portion of the center pillar of the vehicle and which takes-up the other end portion of the webbing in a roll form by urging force. The shoulder anchor is disposed at the upper portion of the center pillar, and an intermediate portion of the webbing is movably inserted through the shoulder anchor. An intermediate portion of the webbing passes through the tongue plate. The buckle device stands upright at the side of a seat of the vehicle, and the tongue plate engages therewith.

Various types of the above-described webbing retractor have been proposed. In one type, when the vehicle rapidly decelerates, the webbing retractor temporarily stops rotation of the spool in the webbing pull-out direction. Thereafter, due to a load of a predetermined value or more being applied to the webbing from the vehicle occupant, a torsion bar, which is provided integrally with and coaxially with the axially central portion of the spool, is twisted. The spool is thereby rotated by a predetermined amount in the webbing pull-out direction. In this way, the load which the vehicle occupant receives from the webbing which is in a locked state can be lessened. This mechanism is called a "force limiter mechanism".

In a webbing retractor equipped with this type of a force limiter mechanism, a locking assembly, which locks rotation of the torsion bar in the webbing pull-out direction at the time when the vehicle rapidly decelerates, must be coaxially fixed to the axially central portion of the spool shaft. Thus, conventionally, the locking assembly was fixed to the spool by inserting a stopper, which was made of resin and formed in a substantial U shape, into the spool in a direction orthogonal to the axis of the spool, and by plastically deforming the stopper.

In recent years, structures have been proposed in which the load, at the time when the spool can rotate again by a predetermined amount in the webbing pull-out direction due to an increase in the webbing tensile force after the rotation of the spool in the webbing pull-out direction has been stopped at the time when the vehicle rapidly decelerates (this load is the force limiter load and hereinafter will be abbreviated as "FL load"), is set to be two stages. Namely, in the initial stage of the time when the vehicle rapidly decelerates, the FL load is maintained high, and the energy absorption efficiency is high. Thereafter, by reducing the FL load, the load which the vehicle occupant receives from the webbing is reduced.

When the above-described fixing structure is applied to a webbing retractor which is equipped with a force limiter mechanism which is this two-stage FL load type, a large load in the thrusting direction arises. Thus, there is the possibility that the conventional resin stopper will not be able to withstand this load, and the locking assembly will spring out in the axial direction. Accordingly, this springing-out of the locking assembly must be suppressed by forming the stopper of metal. However, if the stopper is formed of metal, press-fitting of the stopper into the spool by plastic deformation is not possible, and therefore, noise arises at the time of ordinary operation of the webbing retractor.

SUMMARY OF THE INVENTION

In view of the aforementioned, an object of the present invention is to provide a webbing retractor which can prevent the generation of noise at the time of ordinary operation, which noise is caused by a stopper member being insufficiently pressed-in, and which can more strongly fix a locking device to a spool.

An aspect of the present invention is a webbing retractor comprising: a spool taking up a webbing, for restraining a vehicle occupant, in a roll form by urging force; an energy absorbing member permitting a predetermined amount of rotation of the spool in a webbing pull-out direction; a locking device stopping rotation of the energy absorbing member at a time of rapid deceleration of a vehicle; and a stopper member which, when installed, applies both press-in load in a thrusting direction and press-in load in a radial direction, between one portion of the locking device and the spool. The energy absorbing member is connected coaxially to the spool, and usually rotates integrally with the spool. In a state in which rotation of the energy absorbing member in the webbing pull-out direction is impeded, the energy absorbing member deforms due to a load of a predetermined value or more being applied to the energy absorbing member via the spool, and the energy absorbing member permits a predetermined amount of rotation of the spool in the webbing pull-out direction. One portion of the locking device is inserted coaxially between the energy absorbing member and the spool. The stopper member is a member which is installed by being inserted between the outer peripheral surface of one portion of the locking device and the inner peripheral surface of the spool, from a direction orthogonal to the axis.

In the webbing retractor relating to the present invention, the stopper member may have a terminal end portion which is formed by being bent back and which, in an installed state, applies elastic restoring force in the radial direction between one portion of the locking device and the spool.

In the webbing retractor relating to the present invention, a protruding portion may be formed at the terminal end portion of the stopper member, and the protruding portion protrudes in a widthwise direction of the terminal end portion, and at a time of installation, due to the protruding portion being pushed relatively from a spool side, the protruding portion elastically deforms and applies elastic restoring force in the thrusting direction between one portion of the locking device and the spool.

Further, in the webbing retractor relating to the present invention, a portion of the stopper member which opposes the terminal end portion may, in an installed state, be pressed so as to contact and be trained along the outer peripheral surface of one portion of the locking device.

In the webbing retractor relating to the present invention, a projecting portion, which projects in a direction opposite to the direction in which the terminal end portion is bent back, may be formed at the portion which is pressed into contact in this way. Moreover, an interference portion, which, in the installed state of the stopper member, interferes with the projecting portion and hinders movement of the stopper member in the direction opposite to the direction of insertion, may be formed at the spool.

In the webbing retractor relating to the present invention, in addition to any of the above-described structures, a resistance imparting device may be provided between the spool and the locking device. The resistance imparting device usually rotates integrally with the spool without imparting rotational resistance to the spool. After locking by the locking device, in an initial stage of rotation of the spool in a webbing pull-out direction, the resistance imparting device imparts resistance to the rotation of the spool in the webbing pull-out direction, and thereafter, cancels the state of imparting resistance.

In accordance with the present invention, usually, the energy absorbing member, which is connected coaxially to the spool, rotates integrally with the spool in the webbing pull-out direction and the webbing take-up direction.

When the vehicle rapidly decelerates, rotation of the energy absorbing member in the webbing pull-out direction is stopped by the locking device. In this way, rotation of the spool in the webbing pull-out direction also is temporarily stopped. Inertial force toward the front of the vehicle is applied to the vehicle occupant, and load in the pulling-out direction is applied to the webbing from the vehicle occupant. When this load reaches a predetermined value or more, the energy absorbing member deforms, and the spool is rotated by a predetermined amount in the webbing pull-out direction. Then, the load applied to the vehicle occupant from the webbing is reduced.

Here, in the present invention, the stopper member is, from the direction orthogonal to the axis, inserted into and installed in between the inner peripheral surface of the spool and the outer peripheral surface of one portion of the locking device which is coaxially inserted between the energy absorbing member and the spool. In the state in which the stopper member is installed between the outer peripheral surface of one portion of the locking device and the inner peripheral surface of the spool, not only press-in load in the thrusting direction, but also press-in load in the radial direction, is applied between the two. Thus, sufficient press-in load is applied between the two, and insufficient pressing-in of the stopper member is eliminated.

Moreover, in addition to the press-in load in the thrusting direction, press-in load in the radial direction is also applied. Therefore, the locking device can be even more reliably fixed to the spool.

In accordance with the present invention, there are cases in which the stopper member is provided with a terminal end portion which is formed by being bent back. In this case, when the stopper member is installed in, the terminal end portion elastically deforms and applies elastic restoring force in the radial direction between the spool and one portion of the locking device. Accordingly, elastic restoring force in the radial direction can be applied between the two by the simple structure of bending back.

In accordance with the present invention, there are cases in which a protruding portion, which protrudes in the widthwise direction of the terminal end portion, is provided at the terminal end portion of the stopper member. In this case, when the stopper member is installed, the protruding portion is relatively pushed from the spool side and the terminal end portion elastically deforms in the widthwise direction thereof, i.e., in the thrusting direction. Thus, elastic restoring force in the thrusting direction is applied between the spool and one portion of the locking device. Accordingly, the press-in load in the thrusting direction can be increased as compared with a structure in which no protruding portion is provided. Moreover, because the protruding portion can be formed integrally with the terminal end portion of the stopper member, the provision of the protruding portion does not lead to an increase in the number of parts.

In accordance with the present invention, there are cases in which, in the state in which the stopper member is installed, the portion of the stopper member, which portion opposes the terminal end portion, is pressed so as to contact and be trained along the outer peripheral surface of one portion of the locking device. In this case, the surface area of contact between the stopper member and the one portion of the locking device increases. Accordingly, both the press-in load in the thrusting direction and the press-in load in the radial direction can be increased simultaneously.

In accordance with the present invention, there are cases in which, when the stopper member is inserted, from the direction orthogonal to the axis, between the inner peripheral surface of the spool and the outer peripheral surface of one portion of the locking device, the portion of the stopper member which opposes the terminal end portion is pressed so as to contact and be trained along the outer peripheral surface of the one portion of the locking device. When, accompanying this, the projecting portion, which is formed at the portion of the stopper member which opposes the terminal end portion, similarly is inserted in and the stopper member reaches the installed state (i.e., when the amount of insertion of the stopper member reaches the amount corresponding to completion of installation), the projecting portion interferes with the interfering portion formed at the spool. In this way, movement of the stopper member in the direction opposite to the direction of insertion (i.e., in the direction opposite to the direction of installation) is impeded.

In accordance with the present invention, there are cases in which a resistance imparting device is provided between the spool and the locking device. The resistance imparting device usually rotates integrally with the spool without imparting rotational resistance to the spool. However, at the time of rapid deceleration of the vehicle, when the rotation of the energy absorbing member in the webbing pull-out direction is locked by the locking device, in the initial stage, the resistance imparting device imparts resistance to the rotation of the spool in the webbing pull-out direction. Accordingly, in the initial stage of the rapid deceleration of the vehicle, energy is absorbed at an FL load, in which are added together both an FL load due to deformation of the energy absorbing member and an FL load due to the rotational resistance which the resistance imparting member imparts to the spool. Thereafter, the state in which the resistance imparting member imparts resistance to the spool is cancelled. Accordingly, after the initial stage of the rapid deceleration of the vehicle, energy is absorbed at the FL load due to the deformation of the energy absorbing member. In this way, in accordance with the present invention, the FL load is set to be two stages. At the initial stage of the rapid deceleration of the vehicle, the energy absorption amount is large, and the amount by which the webbing is pulled out (the amount of movement of the vehicle occupant toward the front of the vehicle) is suppressed. Thereafter, the energy absorption amount is decreased and the load applied to the vehicle occupant is lessened.

In this way, in a webbing retractor having a force limiter mechanism in which the FL load is set to be two stages, as described above, a large load is applied to the spool in the initial stage of the rapid deceleration of the vehicle. Therefore, a load in the separating direction is strongly applied to the stopper member. Accordingly, the present invention, which enables the locking device to be strongly fixed to the spool, is suited to this type of webbing retractor.

BRIEF DESCRIPTION OF THE DRAWINGS

FIG. 11A is a plan view of the stopper.

FIG. 11B is a front view of the stopper.

FIG. 11C is a side view of the stopper.

DESCRIPTION OF THE PREFERRED EMBODIMENTS

A webbing retractor 10 relating to a first embodiment of the present invention will be described hereinafter on the basis of FIGS. 1 through 10.

Figure 1:
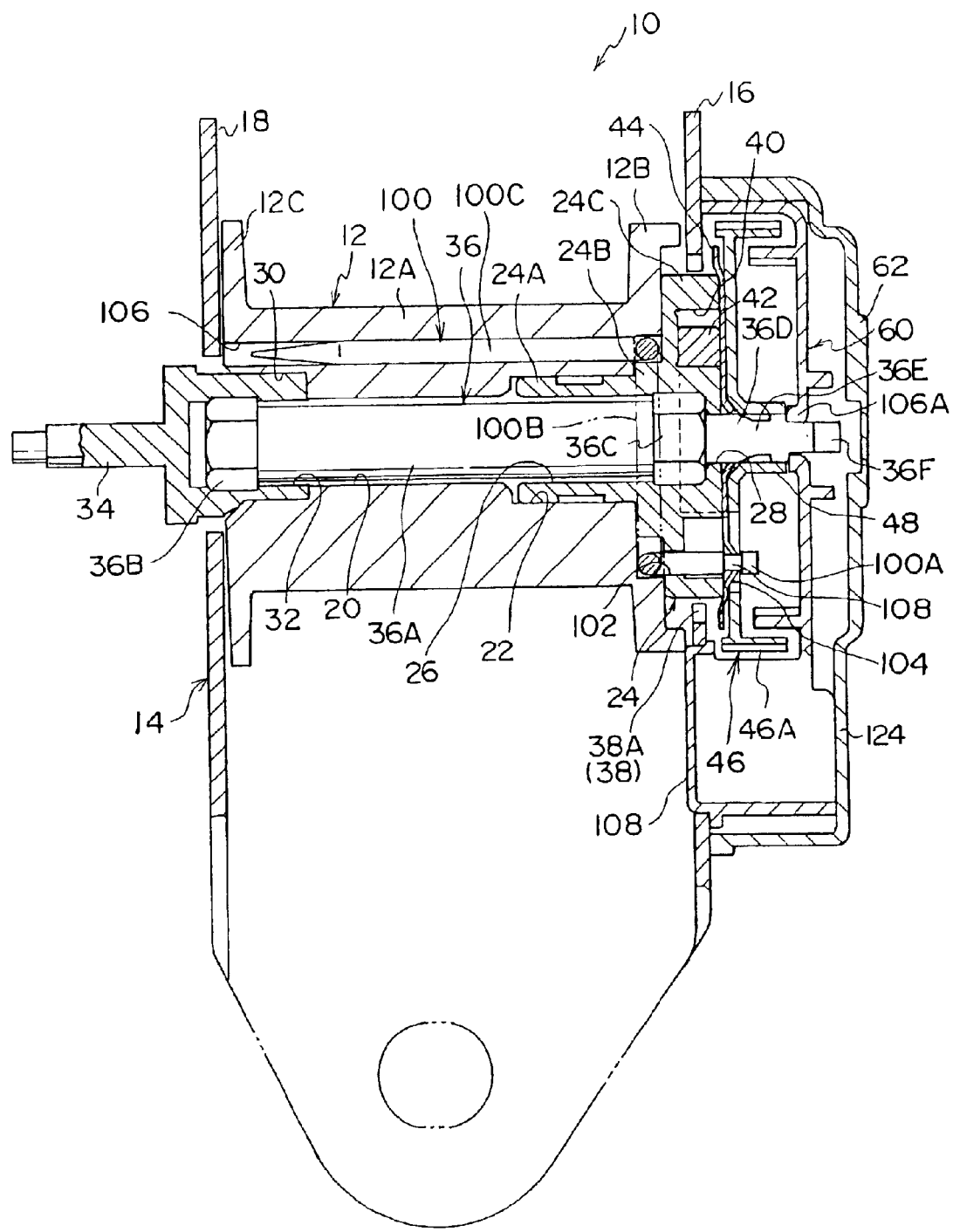
FIG. 1 is a longitudinal sectional view showing the overall structure of a webbing retractor relating to an embodiment of the present invention.

The overall structure of the webbing retractor 10 relating to the present embodiment is shown in sectional view in FIG. 1. As is shown in FIG. 1, the webbing retractor 10 has a frame 14 which is substantially U-shaped as seen in plan view. The frame 14 is fixed to a vehicle body. The frame 14 has a first leg plate 16 and a second leg plate 18 which extend parallel to one another. A spool 12, which is formed by die casting, is rotatably supported between the first leg plate 16 and the second leg plate 18.

The spool 12 is formed by a spool shaft 12A which is shaped as a hollow cylinder and forms an axially central portion, and a pair of flange portions which are formed in substantial disc shapes at the both end portions of the spool shaft 12A. (Hereinafter, the flange portion which is disposed at the first leg plate 16 side will be called a "first flange portion 12B", and the flange portion which is disposed at the second leg plate 18 side will be called a "second flange portion 12C".) The spool 12 is formed on the whole in a drum-like shape. One end of a webbing 100 is anchored on the spool shaft 12A of the spool 12. Due to the spool 12 rotating, the webbing 100 can be freely taken-up and pulled-out with respect to the spool 12.

A shaft through hole 20 is formed in the axially central portion of the spool shaft 12A. A lock base receiving portion 22, which is formed as a recess portion and whose diameter is greater than that of the shaft through hole 20, is formed coaxially at the first flange portion 12B side at the shaft through hole 20. The lock base receiving portion 22 is formed by a recess portion main body 22A which takes up the majority of the lock base receiving portion 22, and a recess portion final end portion 22B whose diameter is greater than that of the recess portion main body 22A. A lock base 24 is mounted in the lock base receiving portion 22 so as to be unable to be removed therefrom. As the method for mounting the lock base 24, a method is employed in which, after the lock base 24 is inserted into the lock base receiving portion 22, a stopper (removal preventing member), which is not illustrated and which is formed in a substantial U-shape as seen in front view, is press-fit in from a direction orthogonal to the axis of the spool shaft 12A. Although the lock base 24 is manufactured by die casting in the present embodiment, the lock base 24 does not necessarily have to be manufactured by die casting. As will become clear from the operation and effects which will be described later, it suffices for the lock base 24 to be formed of a material which can engage with ratchet teeth 38A due to plastic deformation at the time when the lock base 24 is pressed into contact with the ratchet teeth 38A at the time when the vehicle rapidly decelerates.

The lock base 24 is formed in the shape of a hollow cylinder having a collar, and is formed by a base portion 24A, an intermediate portion 24B, and a holding portion 24C. The base portion 24A is fit in the hollow portion main body 22A of the lock base receiving portion 22. The intermediate portion 24B has a larger diameter than that of the base portion 24A, and is fit into the recess portion final end portion 22B of the lock base receiving portion 22. The holding portion 24C has a larger diameter than that of the intermediate portion 24B, and is disposed in a state of abutting the outer side surface of the first flange portion 12B. A hexagonal hole shaped fitting hole 26 is formed in the lock base 24 at a portion thereof other than the axially central portion outer end. Further, a small hole 28, which communicates with the axially central portion of the fitting hole 26 and whose diameter is smaller than that of the fitting hole 26, is formed in the axially central portion outer end of the lock base 24.

A sleeve receiving portion 30, which is formed in the shape of a recess portion and whose diameter is larger than that of the shaft through hole 20, is formed in the second flange portion 12C side of the shaft through hole 20 of the spool shaft 12A. A female spline is formed in the inner peripheral portion of the sleeve receiving portion 30. A sleeve 34, at whose outer peripheral portion a male spline is formed and in whose axially central portion a hexagonal hole shaped fitting hole 32 is formed, is fit into the sleeve receiving portion 30. The inner end of an urging device (a power spring), which urges and rotates the spool 12 in the webbing take-up rotating direction, is anchored via an adapter (not shown) to the distal end portion of the sleeve 34. The sleeve 34 which has the above-described structure is one of the structural parts of a pretensioner which instantaneously rotates the spool 12 in the webbing take-up rotating direction when the vehicle rapidly decelerates.

The lock base 24 and the sleeve 34 are connected together by a torsion bar 36 as an energy-absorbing member. The torsion bar 36 is formed by a shaft portion 36A which forms the main portion of the torsion bar 36; a head portion 36B which is hexagonal and is formed at one end portion of the shaft portion 36A; a fitting portion 36C which is hexagonal and is formed at the other end portion of the shaft portion 36A; a small diameter portion 36D which extends from the axially central portion of the fitting portion 36C so as to be coaxial with the shaft portion 36A; a gear holding portion 36E whose diameter becomes narrow along a taper surface from the small diameter portion 36D, and thereafter, the diameter thereof increases in an annular shape; and a distal end portion 36F which extends coaxially from the gear holding portion 36E and at which a key is formed.

The head portion 36B of the torsion bar 36 is fit into the hexagonal hole shaped fitting hole 32 formed in the sleeve 34. The fitting portion 36C of the torsion bar 36 is fit into the hexagonal hole shaped fitting hole 26 formed in the lock base 24. In this way, the torsion bar 36 is integral with the spool shaft 12A via the lock base 24 and the sleeve 34.

Note that the torsion bar 36 which has the above-described structure is a main structural part of the force limiter mechanism and absorbs energy by torsionally deforming due to webbing tension of a predetermined value or more being applied to the spool 12 when the vehicle rapidly decelerates.

Figure 2:
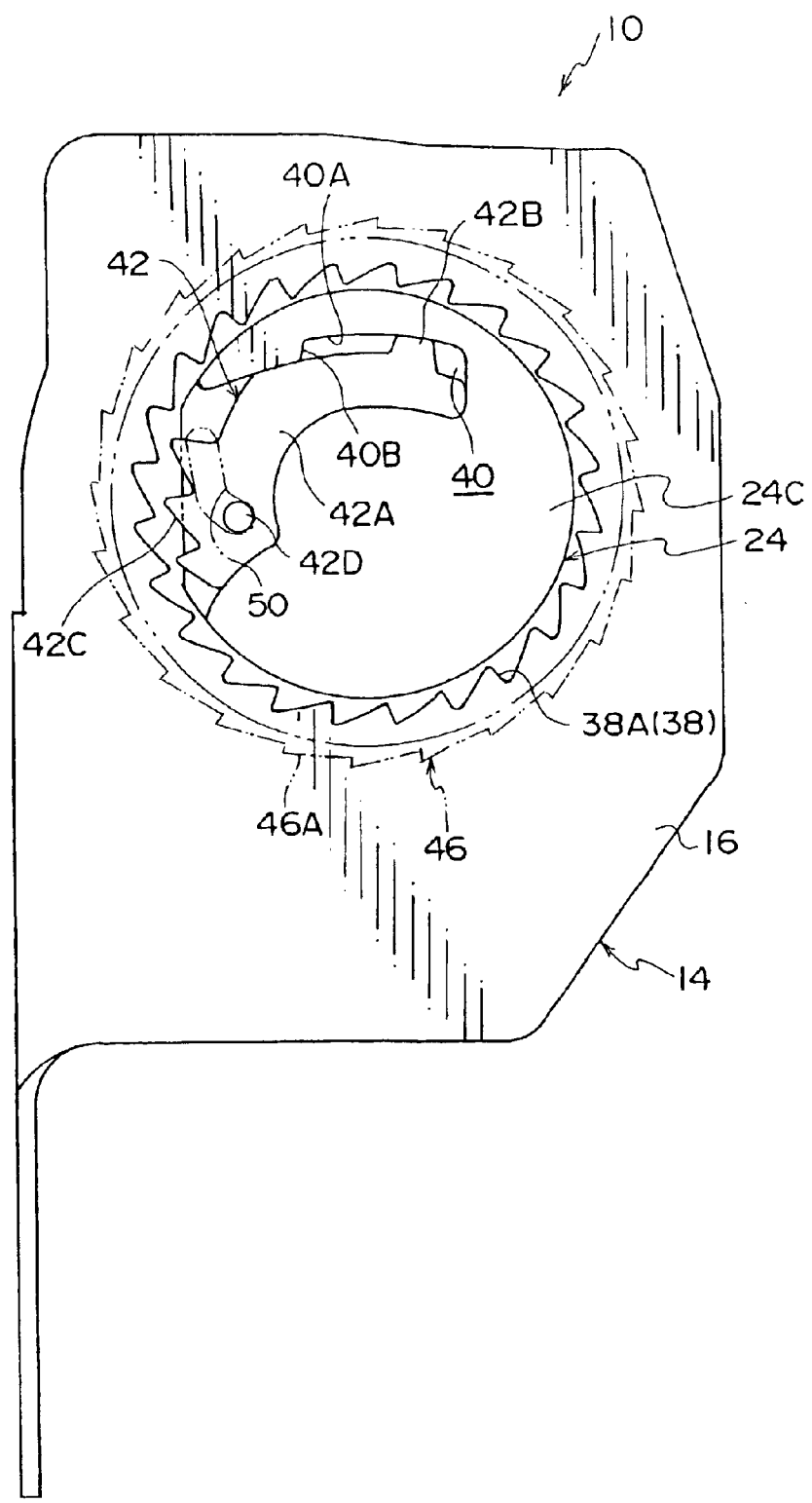
FIG. 2 is a schematic side view showing an unlocked state of the webbing retractor relating to the embodiment.
Figure 3:
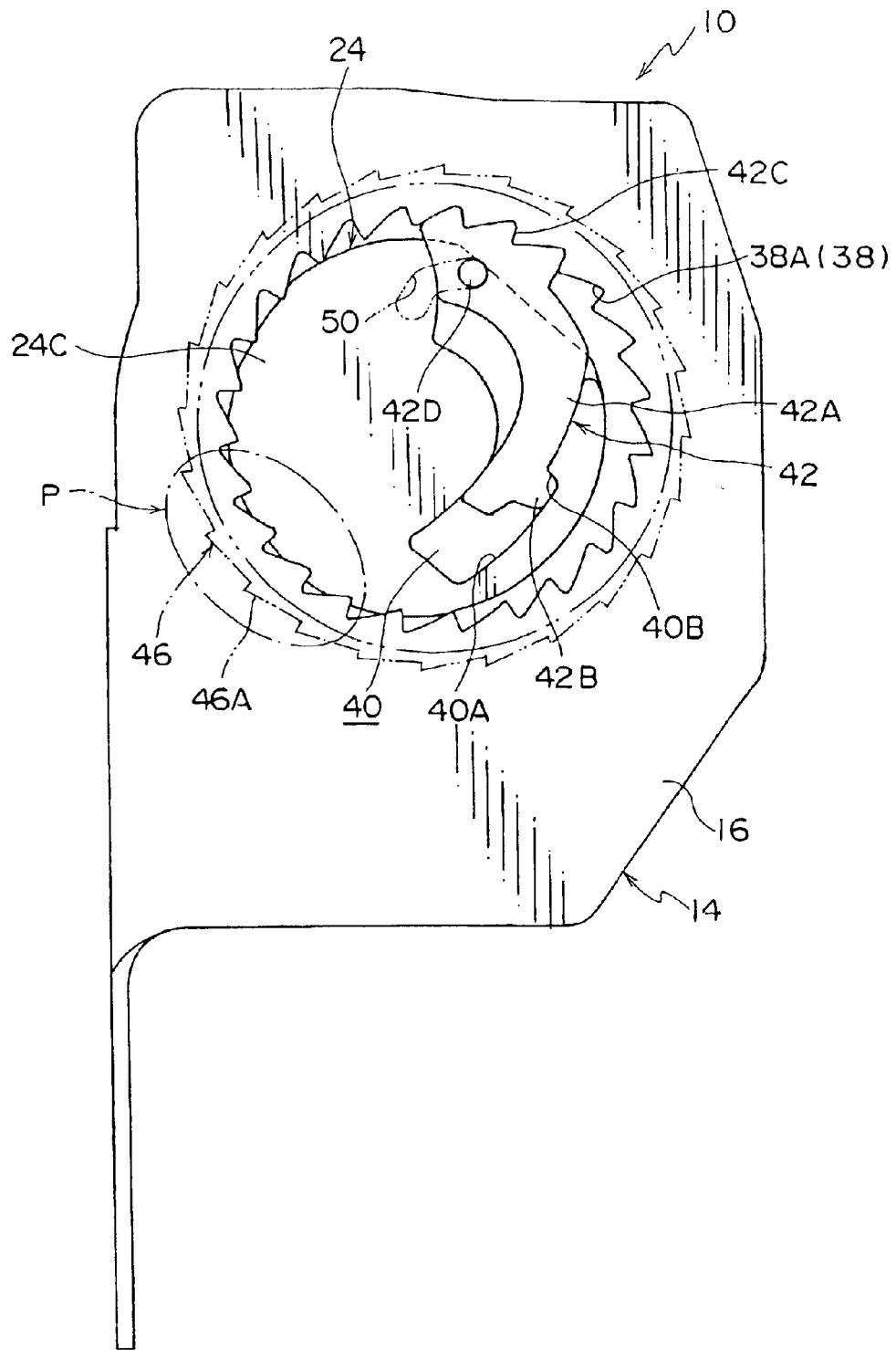
FIG. 3 is a schematic side view showing a locked state of the webbing retractor relating to the embodiment.

As shown in FIGS. 2 and 3, an internal ratchet 38 is formed by punching in the upper portion side of the first leg plate 16 of the frame 14. Ratchet teeth 38 of the internal ratchet 38 are set to have high strength.

The holding portion 24C of the lock base 24 is disposed at the radial direction inner side of the internal ratchet 38. The small diameter portion 36D of the torsion bar 36 is inserted in the small hole 28 formed in the axially central portion of the holding portion 24C. A concave accommodating portion 40, which is formed in the peripheral direction around the small hole 28, is formed at the outer surface side of the holding portion 24C. One end portion of the accommodating portion 40 is closed, and the other end portion of the accommodating portion 40 is open. The other end portion side of the accommodating portion 40 of the holding portion 24C of the lock base 24 is chamfered so that an engaging movement of a lock plate 42, which will be described next, with the internal ratchet 38 is not impeded. The lock plate 42, which is formed in a substantially circular arc plate shape, is accommodated within the accommodating portion 40. Further, a thin disc-shaped lock cover 44 for preventing the lock plate 42 from falling off, is mounted in a state in which rotation thereof is prevented, at the outer side surface at the holding portion 24C of the lock base 24.

The lock plate 42 is formed by a plate main body 42A which is formed of metal and is formed in a substantial circular arc plate shape; a projecting portion 42B which is rectangular and juts out from one end portion of the plate main body 42A; high-strength lock teeth 42C which are formed at the outer peripheral portion of the other end portion of the plate main body 42A, and mesh with ratchet teeth 38A of the internal ratchet 38 of the first leg plate 16; and a guide pin 42D which is formed to stand at this other end portion of the plate main body 42A. Note that a length which is the sum of the width of the plate main body 42A and the projecting length of the projecting portion 42B is substantially equal to the width of a wide portion 40A of the accommodating portion 40 of the lock base 24.

A substantially disc-shaped V gear 46, whose diameter is larger than that of the lock base 24, is disposed at a position adjacent to the lock base 24. A solid cylindrical boss 48 is formed at the axially central portion of the V gear 46. The boss 48 is shaft-supported so as to be able to rotate to follow rotation of the gear holding portion 36E of the torsion bar 36. Further, a guide hole 50, which is substantially formed in the shape of a widely-opened letter "V", is formed in the V gear 46. The guide pin 42D which is formed to stand at the lock plate 42 is inserted into the guide hole 50. Moreover, lock teeth 46A are formed integrally at the outer peripheral portion of the V gear 46.

Figure 4:
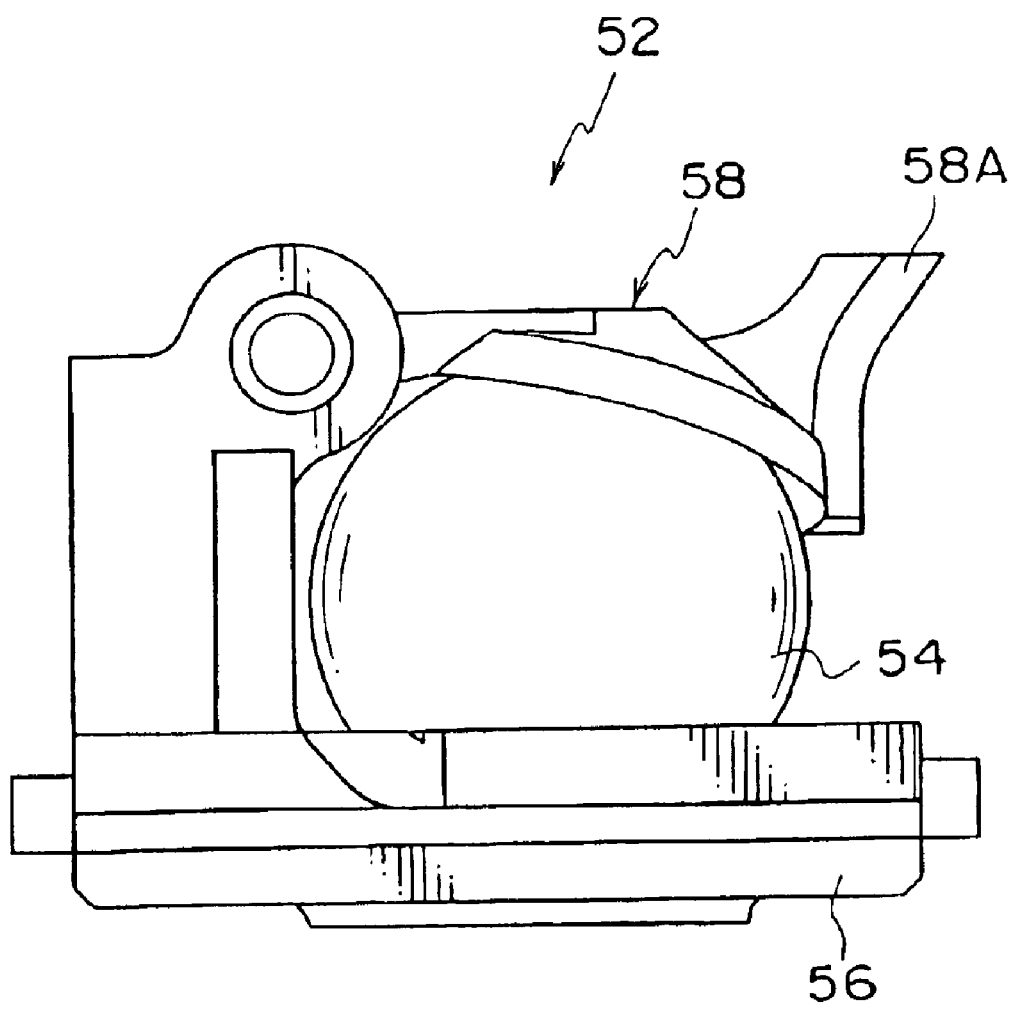
FIG. 4 is a side view of an acceleration sensor which is not shown in FIG. 1.

An acceleration sensor 52 for VSIR (vehicle sensitive inertia reel) which is shown in FIG. 4 is disposed beneath the V gear 46. Note that the acceleration sensor 52 is not illustrated in FIGS. 1 through 3. At the time of rapid deceleration of the vehicle, a ball 54 of the acceleration sensor 52 rolls on a sensor housing 56 and swings a sensor lever 58, and a lock claw 58A of the sensor lever 58 engages with the lock tooth 46A of the V gear 46.

The acceleration sensor 52 is held by a sensor holder 60 made of resin. A sensor cover 62, which is made of resin and has a shape which resembles that of the sensor holder 60, is disposed at the outer side of the sensor holder 60. The sensor holder 60 and the sensor cover 62 are made integral and fixed to the first leg plate 16 of the frame 14. A boss 60A, which is tubular and is short, is formed integrally with the axially central portion of the sensor holder 60. The boss 60A is shaft-supported at a distal end portion 36F of the torsion bar 36. Namely, the sensor holder 60 functions as a bearing of the torsion bar 36. Inner teeth, which can engage with a pawl for a WSIR which is not illustrated and is shaft-supported at the V gear 46, are formed integrally at the inner peripheral portion of the sensor holder 60.

In the above-described structure, the lock base 24, the internal ratchet 38, the lock plate 42, the lock plate cover 44, the V gear 46, the acceleration sensor 52, the sensor holder 60 and the sensor cover 62 correspond to the "locking device" of the present invention.

[Structure Relating to Two-Stage FL Structure]

As shown in FIG. 1, a wire 100, which serves as a "resistance imparting member" formed of an extremely hard material, spans between the spool shaft 12A of the spool 12 and the lock base 24. To describe the wire 100 more concretely with reference to FIGS. 6A and 6B, the wire 100 is formed by one end portion 100A which is relatively short; an intermediate portion 100B which is bent at a right angle from the one end portion 100A and curves in a circular arc shape; and a main body portion 100C which is relatively long, and is bent from the distal end portion of the intermediate portion 100B, and extends substantially parallel to the one end portion 100A in the direction opposite to the direction in which the one end portion 100A extends. Note that the distal end portion of the main body portion 100C is formed in a substantial taper shape.

Figure 7:
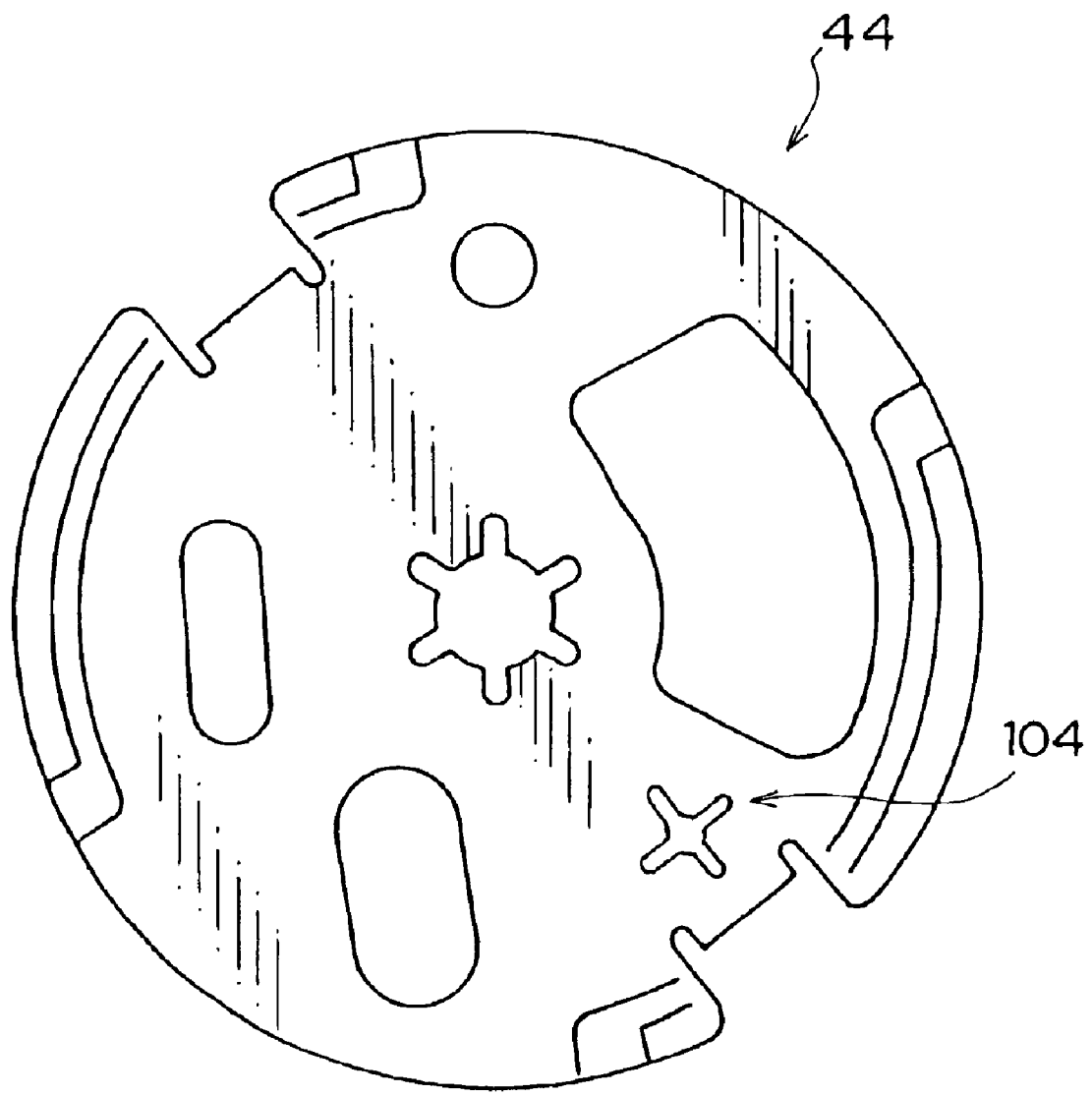
FIG. 7 is a front view showing a lock plate cover at which a push nut is formed.

As shown in FIG. 1, a wire insert-through hole 102, which passes through in the direction of the plate thickness of the bottom wall portion of the holding portion 24C of the lock base 24, is formed in the bottom wall portion of the holding portion 24C of the lock base 24, so as to correspond to the structure of the wire 100. Moreover, as shown in FIG. 7, a push nut 104, which is for fixing the one end portion 100A of the wire 100, is formed integrally at a predetermined position of the lock plate cover 44 which is assembled to the lock base 24. A wire insert-through hole 106 is formed in the spool shaft 12A parallel to the axis thereof. The wire insert-through 102 at the lock base 24 and the wire insert-through hole 106 at the spool shaft 12A are positioned so as to be parallel to one another.

As will be described later, the wire 100 having the above-described structure spans between the spool shaft 12A and the lock base 24. In the state in which the lock plate cover 44 is attached to the lock base 24, after the one end portion 100A of the wire 100 is inserted into the wire insert-through hole 102 of the lock base 24, the one end portion 100A of the wire 100 is fixed to the lock base 24 by the one end portion 100A being press-fit into the push nut 104 of the lock plate cover 44. Further, in this state, when the lock base 24 is attached to the spool shaft 12A, the main body portion 100C of the wire 100 is inserted into and anchored at the interior of the wire insert-through hole 106 of the spool shaft 12A.

[Main Structure of Present Embodiment]

Figure 8:
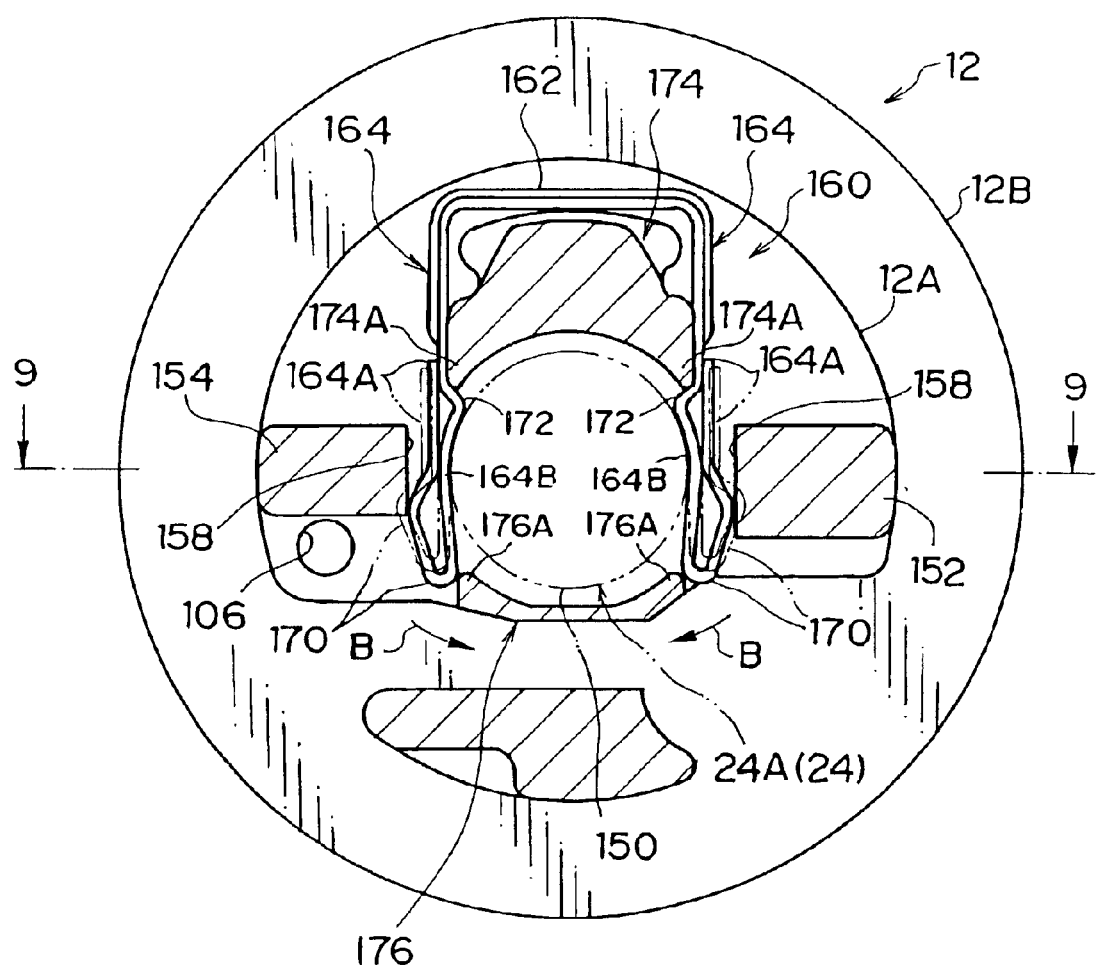
FIG. 8 is a cross-sectional view, taken along line 8—8 of FIG. 9, relating to a schematic longitudinal sectional view of a spool.
Figure 9:
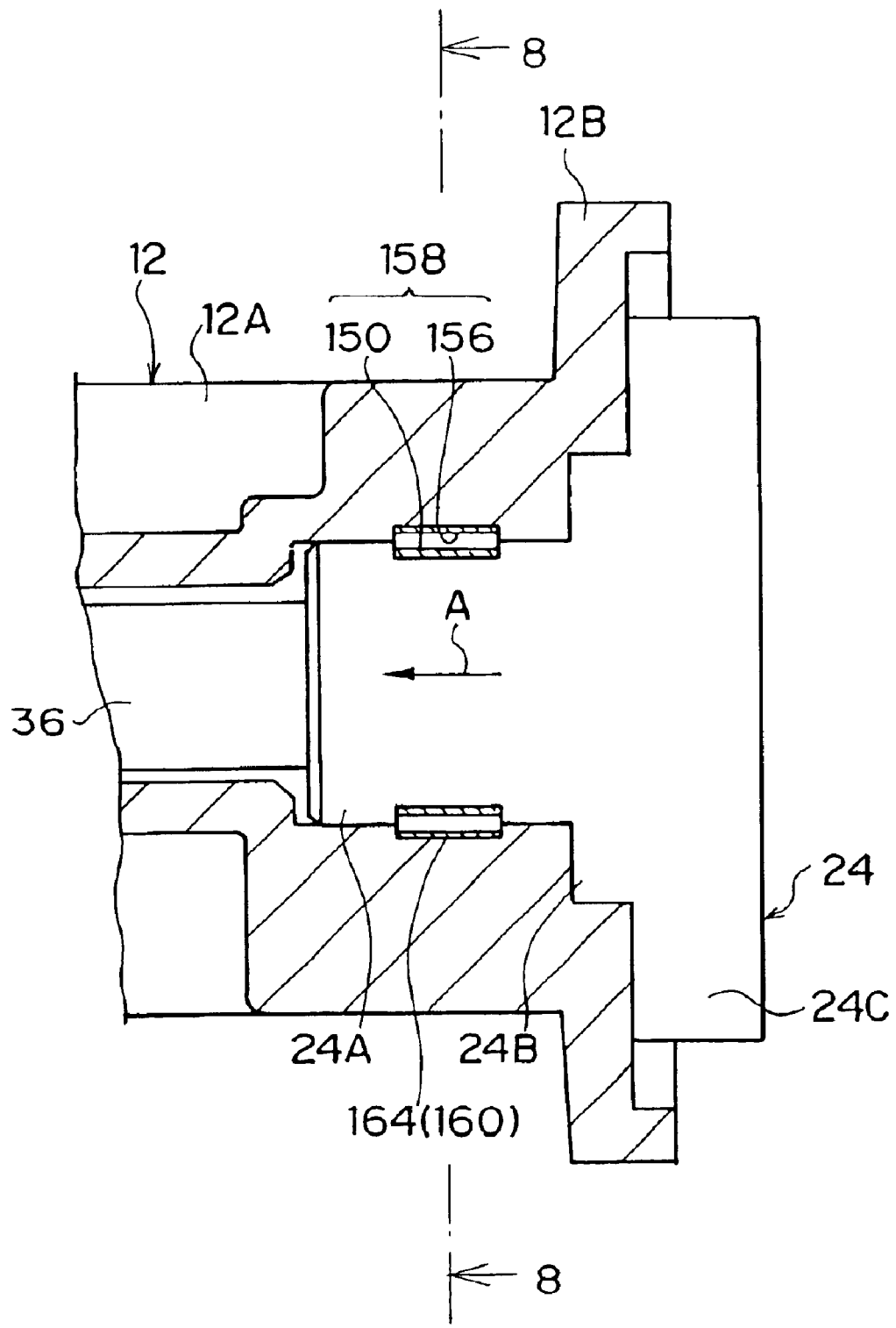
FIG. 9 is a cross-sectional view, taken along line 9—9 of FIG. 8, relating to a schematic horizontal sectional view of the spool.
Figure 10:
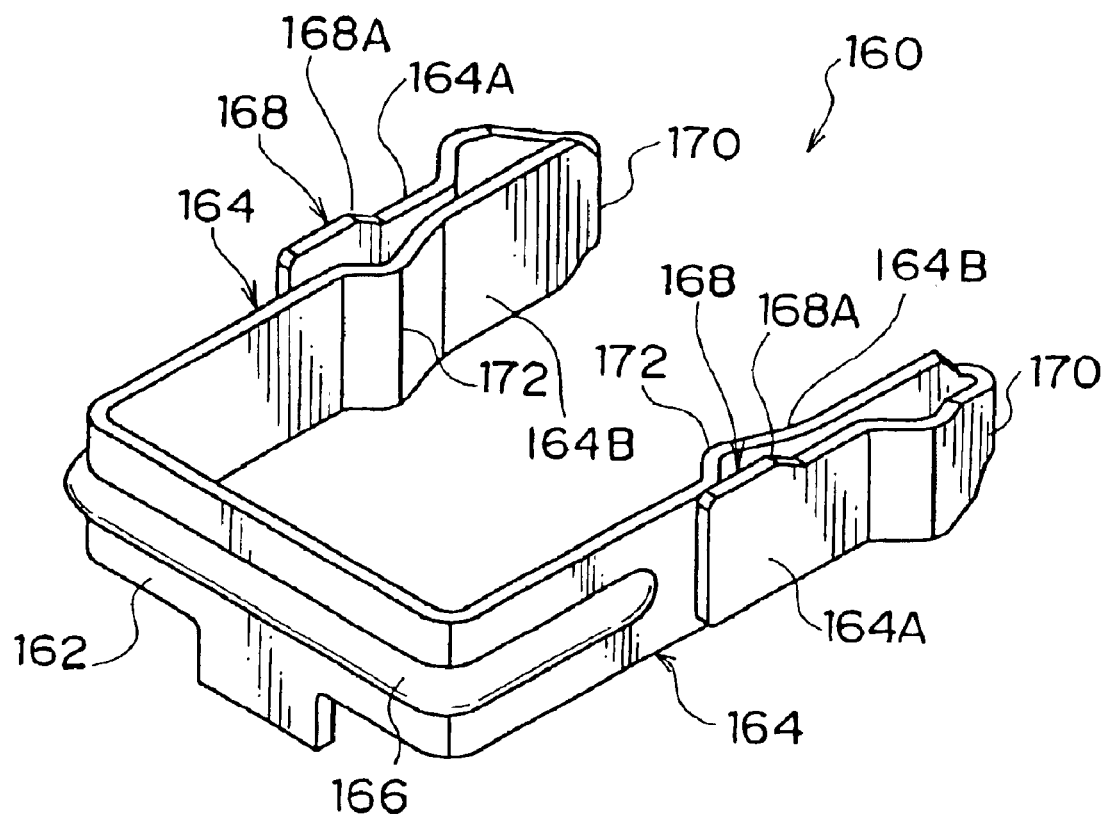
FIG. 10 is a perspective view of a stopper.

FIG. 8 shows the schematic longitudinal sectional structure of the spool 12. FIG. 9 shows the schematic horizontal sectional structure of the spool 12. As is shown in these figures, an annular groove 150, which has a predetermined groove width and whose bottom is relatively shallow, is formed in the outer peripheral surface of the base portion 24A of the lock base 24. A first block 152 and a second block 154 are continuous with the first flange portion 12B. The first block 152 and the second block 154 oppose one another in the radial direction of the spool shaft 12A. Linear insertion grooves 156 are formed in the first block 152 and the second block 154 at positions opposing the annular groove 150 of the lock base 24 which is in an installed state. The groove widths and the groove depths of the insertion grooves 156 substantially coincide with the groove width and the groove depth of the annular groove 150. Accordingly, in the state in which the lock base 24 is assembled to the spool shaft 12A, the annular groove 150 and the insertion grooves 156 communicate with one another in the radial direction of the spool shaft 12A. An insert-in portion, which includes a pair of insert-in holes 158, is thereby formed. The hole width of the insert-in hole 158 is set so as to substantially coincide with the widthwise direction dimension of a leg portion 164 of a stopper 160 which will be described later. Thus, in the state in which the stopper 160 is assembled with the spool shaft 12A, press-in load in the thrusting direction (the direction of arrow A in FIG. 9) is applied between the spool 12 and the lock base 24.

The stopper 160, which serves as a "stopper member" and is formed in a substantial U shape by press molding an elastically deformable metal material, is inserted (press-fit) into the pair of insert-in holes 158. As is shown in FIG. 10 and FIGS. 11A through 11C, the stopper 160 is formed by an intermediate portion 162 formed in a tie-plate shape, and a pair of the leg portions 164 which are bent from the both ends of the intermediate portion 162 and extend parallel to one another. The pair of leg portions 164 are elastically deformable in directions of approaching one another and directions of moving away from one another (the radial direction, i.e., the directions of arrows B in FIG. 8), with the positions at which the leg portions 164 are connected to the intermediate portion 162 being the origins of the elastic deformation. A rib 166 for reinforcement is formed at the stopper 160 from the intermediate portion 162 substantially to the centers of the both leg portions 164.

Figure 12:
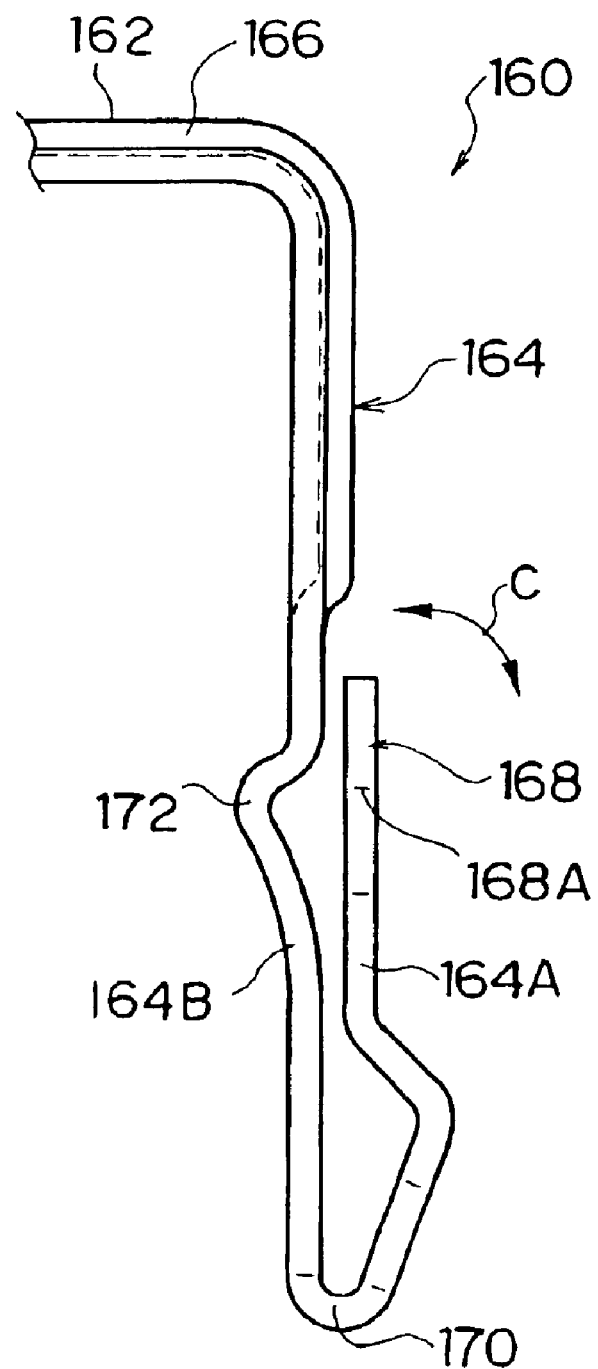
FIG. 12 is an enlarged view of main portions of the stopper.

Further, as shown in the enlarged view of FIG. 12, a terminal end portion 164A of each leg portion 164 is bent back outwardly. The terminal end portion 164A extends parallel to the leg portion 164 and is disposed so as to be set apart from the leg portion 164. Accordingly, the terminal end portion 164A is elastically deformable in a direction of approaching and a direction of moving away from the leg portion 164 (i.e., in the directions of arrow C in FIG. 12), with the distal end of the leg portion 164 being the origin of the elastic deformation.

Figure 13:
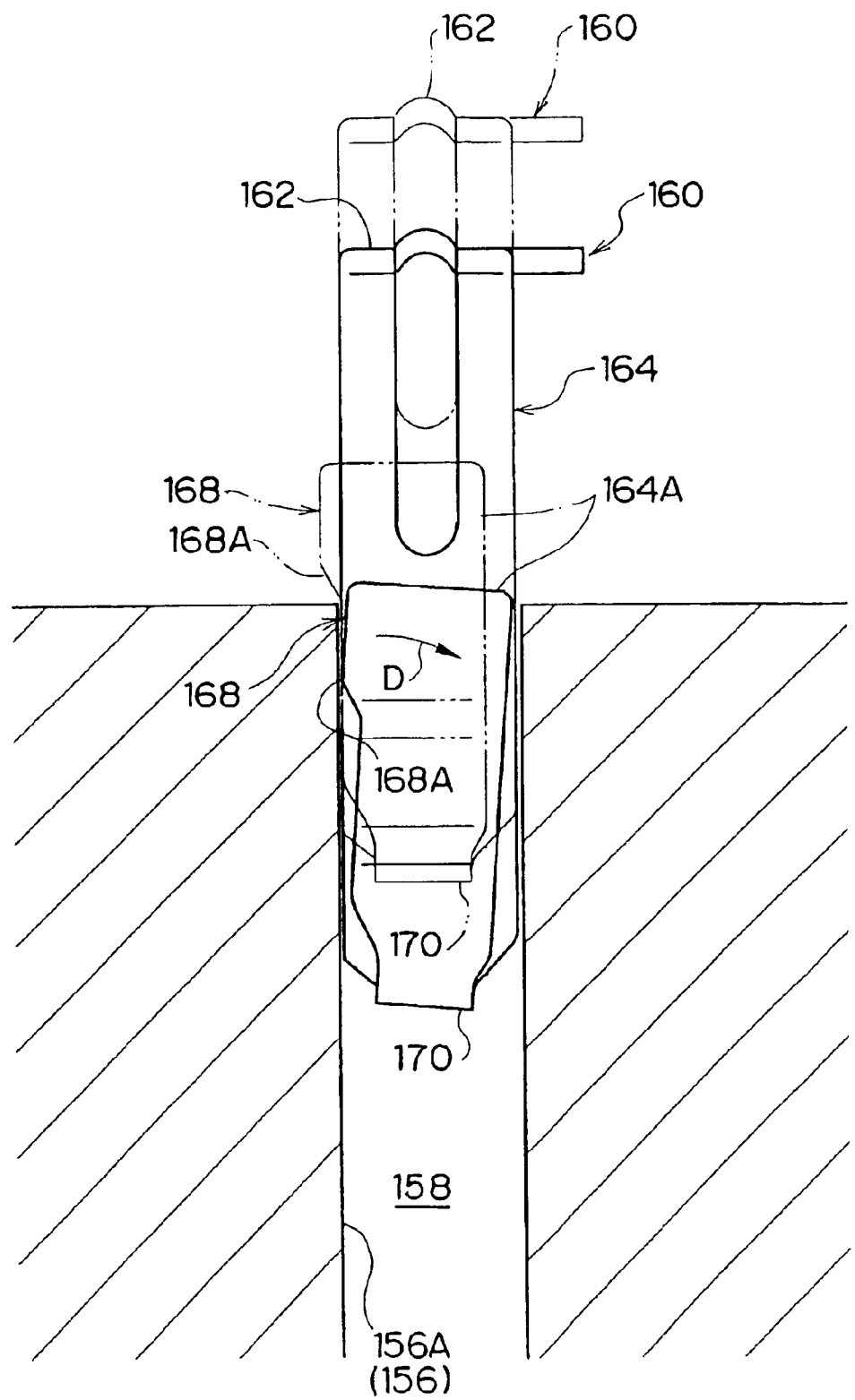
FIG. 13 is a side view for explaining operation of the stopper.

Moreover, as shown in FIGS. 11B and 13, the widthwise direction dimension of the terminal end portion 164A is set to be slightly shorter than the widthwise direction dimension of the leg portion 164. The stopper 160 is formed such that, in the natural state, the top edges of both coincide. A substantially trapezoidal protrusion 168, which protrudes to the extent of jutting out slightly from the top edge of the leg portion 164, is formed integrally with the top edge end portion of the terminal end portion 164A. In the state in which the stopper 160 is assembled with the spool 12, as shown in FIG. 13, by relatively pressing a corner portion 168A of the protrusion 168 against a side wall surface 156A of the insertion groove 156 of the spool 12, the corner portion 168A flexes in the direction opposite to the direction of protruding (i.e., flexes in the direction of arrow D in FIG. 13), and applies urging force via the leg portion 164 to the lock base 24 in the direction opposite to the direction of removal (i.e., applies urging force in the direction of arrow A in FIG. 9).

In addition, as shown in FIG. 12, a substantially triangular projecting portion 172, which projects in the direction opposite to the direction in which the terminal end portion 164A is bent back, is formed at an opposing portion 164B which opposes the terminal end portion 164A at the leg portion 164. As shown in FIG. 8, in the state in which the stopper 160 is assembled with the spool 12, the opposing portions 164B, which oppose the terminal end portions 164A at the pair of leg portions 164, are pressed so as to contact and be trained along the outer peripheral surface of the base portion 24A of the lock base 24. At this time, the projecting portions 172 abut and are anchored on outer end edge portions 174A at the axially central side of a third block 174 of the spool 12, and distal end portions 170 abut and are anchored on outer end edge portions 176A of a fourth block 176 of the spool 12.

Next, operation and effects of the present embodiment will be described.

A vehicle occupant holds a tongue plate (not shown), through which the webbing 100 passes, and pulls the webbing 100 out from the spool 12 against the urging force of a power spring, and engages the tongue plate with a buckle device (not shown). In this way, the vehicle occupant is in a state in which the webbing 100 of a three-point-type seat belt device is applied to him/her. Namely, the portion of the webbing 100 from a shoulder anchor (not shown), which is provided at an upper portion of a center pillar, to the tongue plate is the shoulder side webbing 100. The portion of the webbing 100 from the tongue plate to the buckle device is the lap side webbing 100.

During normal driving, the torsion bar 36 rotates together with the spool 12 in an either direction for pulling or retracting the webbing. From this state of normal driving, when, while the vehicle is traveling, the vehicle rapidly decelerates, a pretensioner (not shown) is operated, and the spool 12 is instantaneously made to rotate in the webbing take-up direction via the sleeve 34. Simultaneously, the locking device stops the torsion bar 36 from rotating in the direction for pulling the webbing.

Briefly explaining the operation of the locking device, the state of a rapid deceleration of the vehicle is detected by the acceleration sensor 52. Namely, the ball 54 of the acceleration sensor 52 rolls on the sensor housing 56 and swings the sensor lever 58. In this way, the lock claw 58A of the sensor lever 58 engages with the lock tooth 46A of the V gear 46, and rotation of the V gear 46 in the direction of arrow A is impeded.

Then, the spool 12 is about to rotate in the direction for puling the webbing by responding to the webbing tension acted by the occupant who is inertially moving toward the vehicle front. Thus, relative rotation arises between the spool 12, which is attempting to rotation, and the V gear 46, whose rotation in the direction of arrow A is impeded. When relative rotation arises between these two as understandable from FIGS. 2 and 3, the guide pin 42D of the lock plate 42 which is held in the accommodating portion 40 formed in the holding portion 24C of the lock base 24 is guided within the guide hole 50 of the V gear 46. The guide pin 42S is moved substantially toward the radial direction outer side of the lock base 24. In this way, the lock tooth 42C of the lock plate 42 meshes with the ratchet tooth 38A of the internal ratchet 38 which is provided at the first leg plate 16 of the frame 14, and rotation of the lock base 24 in the direction of arrow A is impeded.

When the lock teeth 42C of the lock plate 42 mesh with the ratchet teeth 38A of the internal ratchet 38, the reaction force at this time is applied to the holding portion 24C of the lock base 24. This reaction force is quite large because it is generated due to the ratchet teeth 38A and the lock teeth 42C which are very strong meshing together at the time when the vehicle rapidly decelerates. Therefore, the reaction force is of course also applied to the torsion bar 36 which passes through the axially central portion of the lock base 24. Moreover, because the distal end portion 36F of the torsion bar 36 is shaft-supported at the boss 60A of the sensor holder 60 which is formed of resin, the reaction force is applied to the boss 60A of the sensor holder 60 from the distal end portion 36F of the torsion bar 36, and the boss 60A of the sensor holder 60 is elastically deformed in the direction of working of the reaction force, i.e., in the direction toward the side opposite the position of engagement of the lock plate 42. Therefore, one portion of the outer periphery of the holding portion 24C of the lock base 24 (the range whose center is the portion denoted by arrow P in FIG. 3) is strongly pushed against the ratchet teeth 38A of the internal ratchet 38 of the frame 14. Because the lock base 24 is formed by die casting, it is relatively soft. Therefore, when the lock base 24 press-contacts the ratchet teeth 38A, the lock base 24 plastically deforms, the ratchet teeth 38A bite into the lock base 24, and the lock base 24 is directly engaged with the ratchet teeth 38A. Due to the above processes, a state (locked state) arises in which the lock plate 42 and the lock base 24 mesh with the internal ratchet 38 of the first leg plate 16 at two places which oppose one another in the radial direction, and rotation of the torsion bar 36 in the webbing pull-out direction is impeded.

When rotation of the torsion bar 36 in the webbing pull-out direction is stopped as described above, the rotation, in the webbing pull-out direction, of the spool 12 which is integral with the torsion bar 36 is also temporarily stopped. However, inertial force toward the front of the vehicle acts on the vehicle occupant, and load is applied from the vehicle occupant to the webbing in the direction of pulling-out. Therefore, when this load reaches a predetermined value or more, torsional deformation arises at the torsion bar 36, and the spool 12 rotates a predetermined amount in the webbing pull-out direction. As a result, the load applied to the vehicle occupant from the webbing is lessened.

Figure 5:
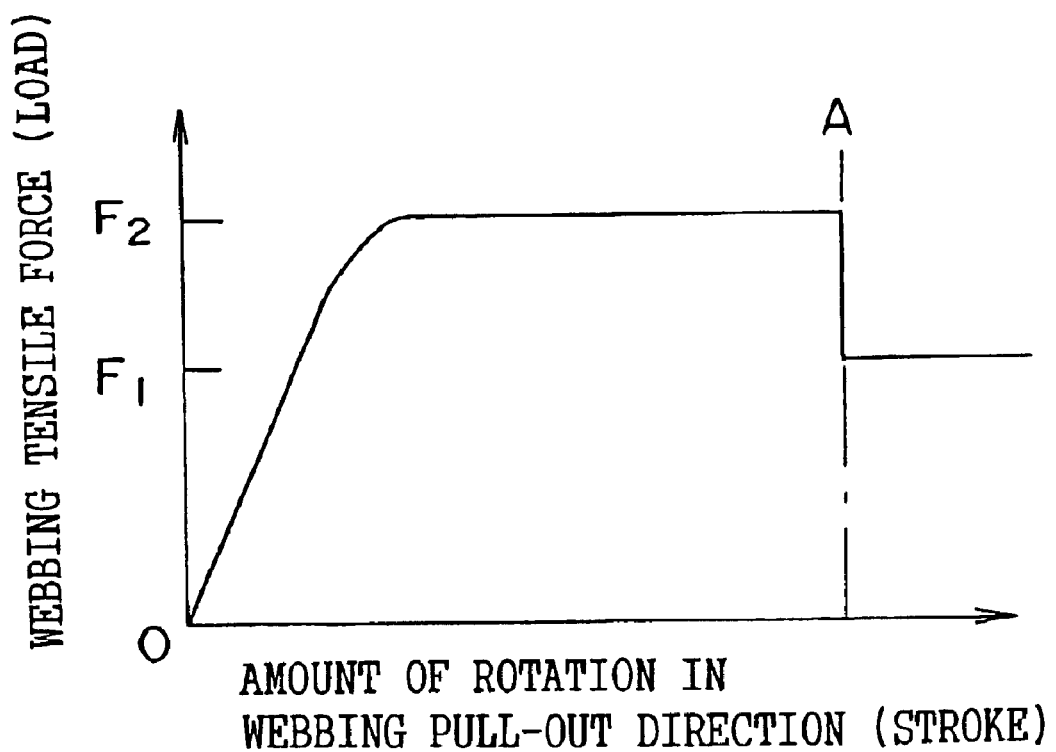
FIG. 5 is a graph showing a two-stage FL load characteristic of the webbing retractor relating to the embodiment.
Figure 6:
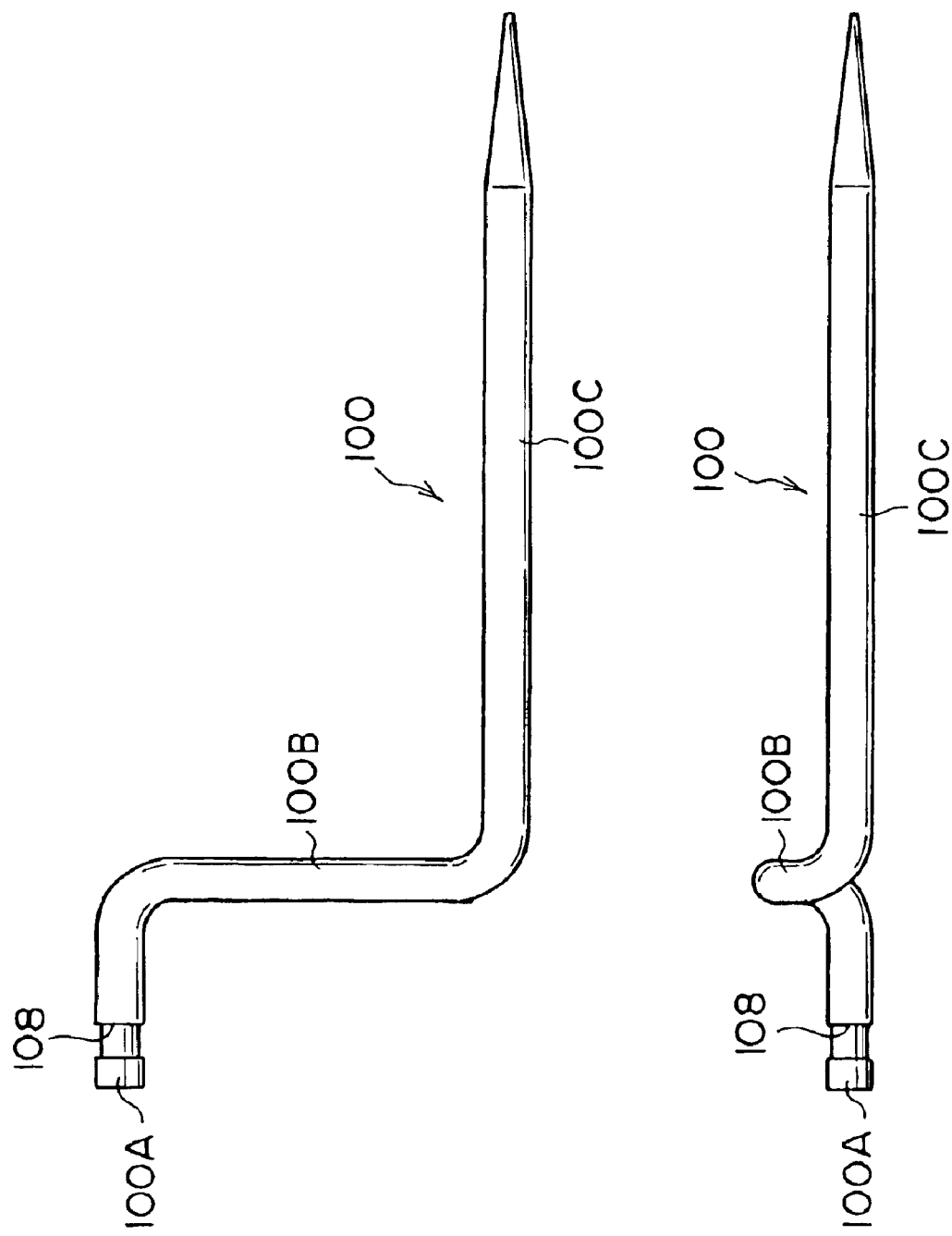
FIG. 6A is a plan view of a wire shown in FIG. 1.
FIG. 6B is a side view of the wire of FIG. 1.

Here, in the present embodiment, the one end portion 100A of the wire 100 is connected to the lock plate cover 44 which forms one portion of the locking device, and the main body portion 100C of the wire 100 is inserted and anchored in the wire insert-through hole 106 of the spool shaft 12A. Therefore, usually, the wire 100 does not impart rotational resistance to the spool 12, and rotates integrally with the spool 12. At the time of a rapid deceleration of the vehicle, in the initial period of the stage when the torsion bar 36 twists in the webbing pull-out direction and the spool 12 rotates in the webbing pull-out direction, the wire 100 imparts resistance to the rotation of the spool 12 in the webbing pull-out direction. More specifically, when the torsion bar 36 twists and the spool 12 rotates relative to the lock base 24, the main body portion 100C of the wire 100, as the spool 12 rotates, is pulled out from the wire insert-through hole 106 of the spool 12, and is taken-up onto the outer peripheral surface of the intermediate portion 24B of the lock base 24. In this process, the wire 100 is strongly rubbed. Accordingly, as shown in FIG. 5, in the initial stage of rapid deceleration of the vehicle, energy absorption is carried out at Force-Limitor (FL) load F2 in which the FL load F1, which is due to the deformation of the torsion bar 36, and the FL load, which is due to the rotational resistance which the wire 100 imparts to the spool 12, are added together. Thereafter, the wire 100 comes out from the wire insert-through hole 106 of the spool shaft 12A. Therefore, the state in which resistance is being imparted to the spool 12 by the wire 100 is cancelled. As a result, after the initial stage of the rapid deceleration of the vehicle, energy absorption is carried out at the FL load F1 which is due to the torsional deformation of the torsion bar 36. In this way, in accordance with the webbing retractor 10 relating to the present embodiment, the FL load is set in two stages. In the initial stage of the rapid deceleration of the vehicle, the energy absorption amount is large and the amount of pulling-out of the webbing (the amount of movement of the vehicle occupant toward the front of the vehicle) can be suppressed, and thereafter, the energy absorption amount is reduced and the load applied to the vehicle occupant can be lessened.

The above has been a description of the overall operation and effects of the webbing retractor 10 relating to the present embodiment. The webbing retractor 10 relating to the present embodiment also has the following peculiar operation and effects.

One is that the lock base 24 is fixed to the spool shaft 12A by the stopper 160, which is metal and formed in a substantial U shape, being inserted (press-fit) into the insert-in holes 158. In the present embodiment, by providing the terminal end portions 164A, which are formed by bending back, at the leg portions 164 of the stopper 160, not only a press-in load in the direction of thrusting, but also a press-in load in the radial direction is applied between the lock base 24 and the spool shaft 12A. Thus, a sufficient press-in load is applied between the lock base 24 and the spool shaft 12A, and insufficient pressing-in of the stopper 160 can be eliminated. As a result, no rattling arises between the lock base 24 and the spool shaft 12A, and the generation of noise at the time when the webbing retractor 10 operates ordinarily can be prevented.

Another is that, as described above, in the present embodiment, by providing the terminal end portions 164A, which are formed by bending-back, at the leg portions 164 of the stopper 160, in addition to the press-in load in the thrusting direction, press-in load in the radial direction also can be applied between the lock base 24 and the spool shaft 12A. As a result, the lock base 24 can be more reliably and more strongly fixed to the spool shaft 12A.

Moreover, in the present embodiment, the stopper 160 is provided with the terminal end portions 164A which are formed by being bent back. When the stopper 160 is installed, the terminal end portions 164A elastically deform, and elastic restoring force in the radial direction is applied between the lock base 24 and the spool shaft 12A.

Accordingly, elastic restoring force in the radial direction can be applied between the lock base 24 and the spool shaft 12A by the simple structure of this bending back. Namely, in accordance with the present invention, the aforementioned effects of "generation of noise at the time of ordinary operation of the webbing retractor 10, which noise is caused by insufficient pressing-in of the stopper 160, can be prevented, and the lock base 24 can be more strongly fixed to the spool 12" can be achieved by a simple structure. As a result, in accordance with the present embodiment, the structure can be simplified and the costs can be reduced.

Fourthly, in the present embodiment, the protruding portions 168, which protrude in the widthwise direction of the terminal end portions 164A, are provided at the terminal end portions 164A of the stopper 160. When the stopper 160 is installed, the protruding portions 168 are pushed relatively by the side walls 156A of the insertion grooves 156 of the spool 12, and the terminal end portions 164A elastically deform in the widthwise direction thereof (the direction of arrow D in FIG. 13). Here, "the widthwise direction of the terminal end portions 164A" means the thrusting direction of the spool shaft 12A. Therefore, elastic restoring force in the thrusting direction is applied between the lock base 24 and the spool shaft 12A. Accordingly, in accordance with the present embodiment, the press-in load in the thrusting direction can be increased as compared with a structure in which the protruding portions 168 are not provided. Moreover, because the protruding portions 168 are formed integrally with the terminal end portions 164A of the stopper 160, the provision of the protruding portions 168 does not lead to an increase in the number of parts. As a result, in accordance with the present embodiment, the strength of fixing the lock base 24 to the spool shaft 12A can be increased at a low cost.

Fifth, in the present embodiment, as shown in FIG. 8, when the stopper 160 is inserted into the insert-in holes 158, while the terminal end portions 164A of the leg portions 164 are pushed (flexed) toward the axial center (i.e., in the directions of arrows B in FIG. 8) by the end surfaces, at the axially central sides, of the first block 152 and the second block 154 of the spool 12, and the opposing portions 164B of the leg portions 164 slide on the outer peripheral surface of the tubular base portion 24A of the lock base 24, the opposing portions 164B are trained along the outer peripheral surface of the base portion 24A in a state of being pressed into contact therewith. Then, at the point in time when the distal end portions 170 of the stopper 160 are anchored on the outer end edge portions 176A of the fourth block 176, assembly (installation) is completed. In this state as well, the state in which the opposing portions 164B of the leg portions 164 are trained along the base portion 24A is maintained. Accordingly, the surface area over which the stopper 160 and the lock base 24 contact one another is increased, and both the press-in load in the thrusting direction and the press-in load in the radial direction can simultaneously be increased. As a result, in accordance with the present embodiment, it is possible to improve the effect of preventing generation of noise at the time of ordinary operation, and the lock base 24 can be fixed even more strongly to the spool shaft 12A.

Sixth, in the present embodiment, the projecting portions 172 which project inwardly are formed at the opposing portions 164B which oppose the terminal end portions 164A at the leg portions 164 of the stopper 160. When the stopper 160 is inserted into the insert-in holes 158 and reaches the state in which the opposing portions 164B of the leg portions 164 are pressed so as to contact and be trained along the outer peripheral surface of the base portion 24A of the lock base 24 (i.e., when the amount of insertion of the stopper 160 reaches an amount corresponding to that at the time of completion of installation), the projecting portions 172 abut and are anchored on the outer end edge portions 174A of the third block 174 of the spool 12. In this way, movement of the stopper 160 in the direction opposite to the direction of insertion (i.e., movement of the stopper 160 in the direction opposite to the direction of installation) is impeded. As a result, in accordance with the present embodiment, the stopper 160 itself can be prevented from coming out from the spool 12. This can be expanded into the effect which will be described hereinafter (the effect of ensuring the reliability of operation of the webbing retractor 10 equipped with a force limiter mechanism having a two-stage FL load structure).

Seventh, the present embodiment applies the stopper 160, which is structured as described above and to which various improvements have been made, to the webbing retractor 10 which is a type in which the structure of strongly rubbing the wire 100 is added to the structure in which the torsion bar 36 torsionally deforms such that the FL load is set to be two stages. Therefore, the following operation and effects are obtained by the present embodiment. Namely, in this type of webbing retractor 10, as described in the section discussing the overall operation and effects, a large load is applied to the spool 12 in the initial stage of rapid deceleration of the vehicle. Therefore, load in the removing direction (in the direction opposite to the direction of arrow A in FIG. 9) is applied to the stopper 160. Accordingly, when using the stopper 160 of the present embodiment, which can strongly fix the lock base 24 to the spool 12, in the webbing retractor 10 which has a two-stage FL load structure, even when a large FL load is applied (in FIG. 5, when the FL load is F2), the locking device including the base lock 12 can reliably be prevented from separating from the spool 12 (i.e., the locking device can reliably be prevented from springing out in the direction opposite to the direction of arrow A in FIG. 9). As a result, in accordance with the present embodiment, it is possible to ensure the reliability of operation of the webbing retractor 10 which is provided with a force limiter mechanism having a two-stage FL load structure.

Note that, in the present embodiment, the present invention is applied to the webbing retractor 10 which is provided with both a pretensioner mechanism and a force limiter mechanism. However, the present invention is not limited to the same, and may be applied to a webbing retractor which is equipped with the latter mechanism but not the former.

Moreover, in the present embodiment, a locking structure, in which the single lock plate 42 is used as a trigger, is employed as the locking device. However, the present invention is not limited to the same, and any of various locking devices can be applied to the present invention.

Moreover, in the present embodiment, the present invention is applied to the webbing retractor 10 which is equipped with a force limiter mechanism having a two-stage FL load structure. However, the present invention is not limited to the same, and may be applied to a webbing retractor equipped with a force limiter mechanism having a one-stage FL load structure. (In terms of the present embodiment, the present invention may be applied to a webbing retractor which does not have the wire 100 and in which only the torsion bar 36 bears the force limiter function.)

In the present embodiment, the present invention is applied to the webbing retractor 10 which is equipped with a force limiter mechanism having a two-stage FL load structure of the type in which a wire is strongly rubbed. However, the present invention is not limited to the same, and may be applied to a webbing retractor equipped with a force limiter mechanism having a two-stage FL load structure of a different type.

For example, the present invention may be applied to a webbing retractor employing a force limiter mechanism having a two-stage FL structure. In this force limiter mechanism having a two-stage FL structure, a sensor shaft, which corresponds to a lock base, is disposed coaxially at one end portion in the axial direction of a torsion bar. Further, a tubular, rod-shaped slotted pin is inserted in a direction orthogonal to the axis, between a concave groove, which is formed in the outer peripheral surface of the sensor shaft and whose depth gradually becomes more shallow, and a groove which is formed in the inner peripheral surface of a spool shaft. This structure is a pin deforming type structure in which, when the vehicle rapidly decelerates, rotation of the sensor shaft in the webbing pull-out direction is locked, and thereafter, when the spool rotates in the webbing pull-out direction, the slotted pin is crushed due to the change in the depth of the concave groove.

Moreover, the present invention may be applied to a webbing retractor utilizing a force limiter mechanism having a different two-stage FL structure. In this force limiter mechanism having a two-stage FL structure, a sensor shaft corresponding to a lock base is disposed coaxially at one end portion in the axial direction of a torsion bar. Further, a projection, which can interfere with a (substantially U-shaped) distal end portion of the sensor shaft on the locus of rotation of this distal end portion, is formed at a spool. This structure is a spool shearing type in which, when the vehicle rapidly decelerates, rotation of the sensor shaft in the webbing pull-out direction is locked, and thereafter, when the spool rotates in the webbing pull-out direction, the projection formed at the spool is sheared by the distal end portion of the sensor shaft.

As described above, the webbing retractor of the present invention includes a structure where the locking device is fixed by installing the stopper member from the direction orthogonal to the rotational axis of the spool between the outer peripheral surface of one portion of the locking device and the inner peripheral surface of the spool. In the state in which the stopper member is installed, not only press-in load in the thrusting direction, but also press-in load in the radial direction, is applied between the locking device and the spool. Thus, noise due to insufficient pressing-in of the stopper member of the conventional retractors during operation is eliminated. Further, the locking device can be even more reliably fixed to the spool.

There are cases the stopper member is provided with a terminal end portion which is formed by being bent back. In this case, when the stopper member is installed in, the terminal end portion elastically deforms and applies elastic restoring force in the radial direction between the spool and one portion of the locking device. Accordingly, elastic restoring force in the radial direction can be applied between the two by the simple structure of bending back. As a result, the structure of the retractor is simplified and the cost is reduced.

There are additional cases in which a protruding portion, which protrudes in the widthwise direction of the terminal end portion, is provided at the terminal end portion of the stopper member. In this case, when the stopper member is installed, the protruding portion is relatively pushed from the spool side and the terminal end portion elastically deforms in the widthwise direction thereof, i.e., in the thrusting direction. Thus, elastic restoring force in the thrusting direction is applied between the spool and one portion of the locking device. Accordingly, the press-in load in the thrusting direction can be increased with a simpler structure. As a result, the locking device after fixing can be strengthened with a reduced cost.

Further, there are cases in which, in the state in which the stopper member is installed, the portion of the stopper member, which portion opposes the terminal end portion, is pressed so as to contact and be trained along the outer peripheral surface of one portion of the locking device. In this case, the surface area of contact between the stopper member and the one portion of the locking device increases. Accordingly, both the press-in load in the thrusting direction and the press-in load in the radial direction can be increased simultaneously. As a result, noise eliminating effect and fixing of the locking device to the spool can be further ensured.

Moreover, there are cases in which, when the stopper member is inserted, from the direction orthogonal to the axis, between the inner peripheral surface of the spool and the outer peripheral surface of one portion of the locking device, the portion of the stopper member which opposes the terminal end portion is pressed so as to contact and be trained along the outer peripheral surface of the one portion of the locking device. When, accompanying this, the projecting portion, which is formed at the portion of the stopper member which opposes the terminal end portion, similarly is inserted in and the stopper member reaches the installed state, the projecting portion interferes with the interfering portion formed at the spool. As a result, the stopper member can be prevented from falling out of the spool.

Finally, there are cases in which a resistance imparting device is provided between the spool and the locking device. The resistance imparting device usually rotates integrally with the spool without imparting rotational resistance to the spool. When the locking device locks and the spool is about to rotate in the webbing pull-out direction is locked by the locking device, in the initial stage, the resistance imparting device imparts resistance to the rotation of the spool. Thereafter, the state in which the resistance imparting member imparts resistance to the spool is cancelled. As a result, operational reliability can be endured of the webbing retractor with the force limiter mechanism in which the FL load is set to be two stages.

What is claimed is:

1. A webbing retractor comprising:
    a spool taking up a webbing, for restraining a vehicle occupant, in a roll form by urging force;
    an energy absorbing member connected coaxially to the spool and usually rotating integrally with the spool, and in a state in which rotation of the energy absorbing member in a webbing pull-out direction is impeded, the energy absorbing member deforms due to load of a predetermined value or more being applied to the energy absorbing member via the spool, and permits a predetermined amount of rotation of the spool in the webbing pull-out direction;
    a locking device, one portion of the locking device being coaxially inserted between the energy absorbing member and the spool, the locking device stopping rotation of the energy absorbing member in the webbing pull-out direction at a time of rapid deceleration of a vehicle; and
    a stopper member installed between an outer peripheral surface of one portion of the locking device and an inner peripheral surface of the spool by being inserted from a direction orthogonal to an axis, the stopper member applying both press-in load in a thrusting direction and press-in load in a radial direction between one portion of the locking device and the spool.

2. The webbing retractor of claim 1, wherein the stopper member includes a terminal end portion which is formed by being bent back and which, in an installed state, applies elastic restoring force in the radial direction between one portion of the locking device and the spool.

3. The webbing retractor of claim 2, wherein a protruding portion is formed at the terminal end portion of the stopper member, and the protruding portion protrudes in a widthwise direction of the terminal end portion, and at a time of installation, due to the protruding portion being pushed relatively from a spool side, the protruding portion elastically deforms and applies elastic restoring force in the thrusting direction between one portion of the locking device and the spool.

4. The webbing retractor of claim 2, wherein a portion of the stopper member which opposes the terminal end portion is, in an installed state, pressed so as to contact and be trained along the outer peripheral surface of one portion of the locking device.

5. The webbing retractor of claim 4, wherein a projecting portion, which projects in a direction opposite to a bending back direction of the terminal end portion, is formed at a portion of the stopper member which portion opposes the terminal end portion, and an interfering portion is formed at the spool, and in a state in which the stopper member is installed, the interfering portion interferes with the projecting portion and hinders movement of the stopper member in a direction opposite to an insertion direction.

6. The webbing retractor of claim 1, wherein the spool includes a spool shaft, a flange, and a first block and a second block which are continuous with the flange, the locking device includes a lock base, the lock base is substantially shaped as a flanged tube, the lock base includes a tubular base portion, an annular groove is formed in an outer peripheral surface of the base portion, a substantially linear insertion groove is formed in each of the first block and the second block, and when the lock base is assembled with the spool shaft, the insertion grooves are disposed so as to oppose the annular groove.

7. The webbing retractor of claim 6, wherein when the lock base is assembled to the spool shaft, the insertion grooves and the annular groove form insert-in portions, and the stopper member can be inserted into the insert-in portions.

8. The webbing retractor of claim 7, wherein the stopper member includes a stopper which is formed of an elastically deformable metal and is formed in a substantial U shape.

9. The webbing retractor of claim 7, wherein the stopper member includes a terminal end portion which is formed by being bent back and which, in an installed state, applies elastic restoring force in the radial direction between one portion of the locking device and the spool.

10. The webbing retractor of claim 6, wherein the spool includes a sleeve which is coaxial with the spool, and the energy absorbing member includes a torsion bar, and the torsion bar connects the lock base and the sleeve to one another.

11. The webbing retractor of claim 1, wherein the stopper member includes a stopper which is formed of an elastically deformable metal and is formed in a substantial U shape.

12. The webbing retractor of claim 11, wherein the stopper includes an intermediate portion which is formed in a substantial tie-plate shape, and a pair of leg portions which are bent from both ends of the intermediate portion and extend substantially parallel to one another.

13. The webbing retractor of claim 12, wherein the pair of leg portions of the stopper are elastically deformable so as to approach and move apart from one another, with regions of connection of the leg portions and the intermediate portion being origins of elastic deformation.

14. The webbing retractor of claim 12, wherein the stopper also includes a rib for reinforcement provided so as to reach the pair of leg portions from the intermediate portion.

15. The webbing retractor of claim 12, wherein the stopper member includes a terminal end portion which is formed by being bent back and which, in an installed state, applies elastic restoring force in the radial direction between one portion of the locking device and the spool.

16. The webbing retractor of claim 15, wherein a protruding portion is formed at the terminal end portion of the stopper member, and the protruding portion protrudes in a widthwise direction of the terminal end portion, and at a time of installation, due to the protruding portion being pushed relatively from a spool side, the protruding portion elastically deforms and applies elastic restoring force in the thrusting direction between one portion of the locking device and the spool.

17. The webbing retractor of claim 15, wherein a portion of the stopper member which opposes the terminal end portion is, in an installed state, pressed so as to contact and be trained along the outer peripheral surface of one portion of the locking device.

18. The webbing retractor of claim 17, wherein a projecting portion, which projects in a direction opposite to a bending back direction of the terminal end portion, is formed at a portion of the stopper member which portion opposes the terminal end portion, and an interfering portion is formed at the spool, and in a state in which the stopper member is installed, the interfering portion interferes with the projecting portion and hinders movement of the stopper member in a direction opposite to an insertion direction.

19. The webbing retractor of claim 1, wherein a resistance imparting device is provided between the spool and the locking device, and the resistance imparting device usually rotates integrally with the spool without imparting rotational resistance to the spool, and after locking by the locking device, in an initial stage of rotation of the spool in the webbing pull-out direction, the resistance imparting device imparts resistance to rotation of the spool in the webbing pull-out direction, and thereafter, cancels a state of imparting resistance.

20. The webbing retractor of claim 19, wherein the spool includes a spool shaft, the resistance imparting device includes a wire, one end of the wire is anchored on the spool shaft, and another end of the wire is fixed to one portion of the locking device.

* * * * *